United States Patent [19]

Sundar et al.

[11] 3,966,872

[45] June 29, 1976

[54] COUPLED CATIONIC AND ANIONIC METHOD OF SEPARATING URANIUM

[75] Inventors: Parameshwaran Sundar; Leonard Elikan; Ward L. Lyon, all of Pittsburgh, Pa.

[73] Assignee: Westinghouse Electric Corporation, Pittsburgh, Pa.

[22] Filed: Nov. 1, 1973

[21] Appl. No.: 411,889

[52] U.S. Cl. .................................... 423/9; 423/10; 423/253; 252/301.1 R
[51] Int. Cl.² ........................................ B01D 11/00
[58] Field of Search ................ 423/9, 260, 10, 253; 252/301.1 R

[56] References Cited
UNITED STATES PATENTS

| | | | |
|---|---|---|---|
| 2,859,094 | 11/1958 | Schmitt et al. | 423/10 |
| 3,052,513 | 9/1962 | Crouse | 423/9 |
| 3,083,076 | 3/1963 | Drobnick et al. | 423/9 |
| 3,835,214 | 9/1974 | Hurst et al. | 423/10 |

Primary Examiner—Stephen J. Lechert, Jr.
Attorney, Agent, or Firm—R. D. Fuerle

[57] ABSTRACT

Uranium is separated from contaminating metal ions in an aqueous feed liquor containing the uranyl ion. The liquor is extracted with a first, non-interfering, waterimmiscible, organic solvent containing a reagent which reacts with the uranyl ion to form a complex soluble in the organic solvent. The organic solvent is scrubbed with water if necessary, then stripped with a stripping liquor of an aqueous sulfuric acid liquor having a pH of about 0.5 to about 6 containing a reducing ion or an aqueous carbonate solution having a pH of about 8 to about 9. If the sulfuric acid liquor is used the stripped uranous ion is oxidized and the sulfuric acid liquor is diluted to prevent the precipitation of a uranium complex. The stripping liquor is extracted with an amine liquor comprising a second, noninterfering, water-immiscible, organic solvent and a tertiary or quaternary amine. The amine liquor is stripped with an ammonium carbonate solution to precipitate a uranium complex. The uranium complex is filtered off and may be calcined to produce $U_3O_8$ or $UO_2$.

38 Claims, 1 Drawing Figure

U.S. Patent  June 29, 1976  3,966,872
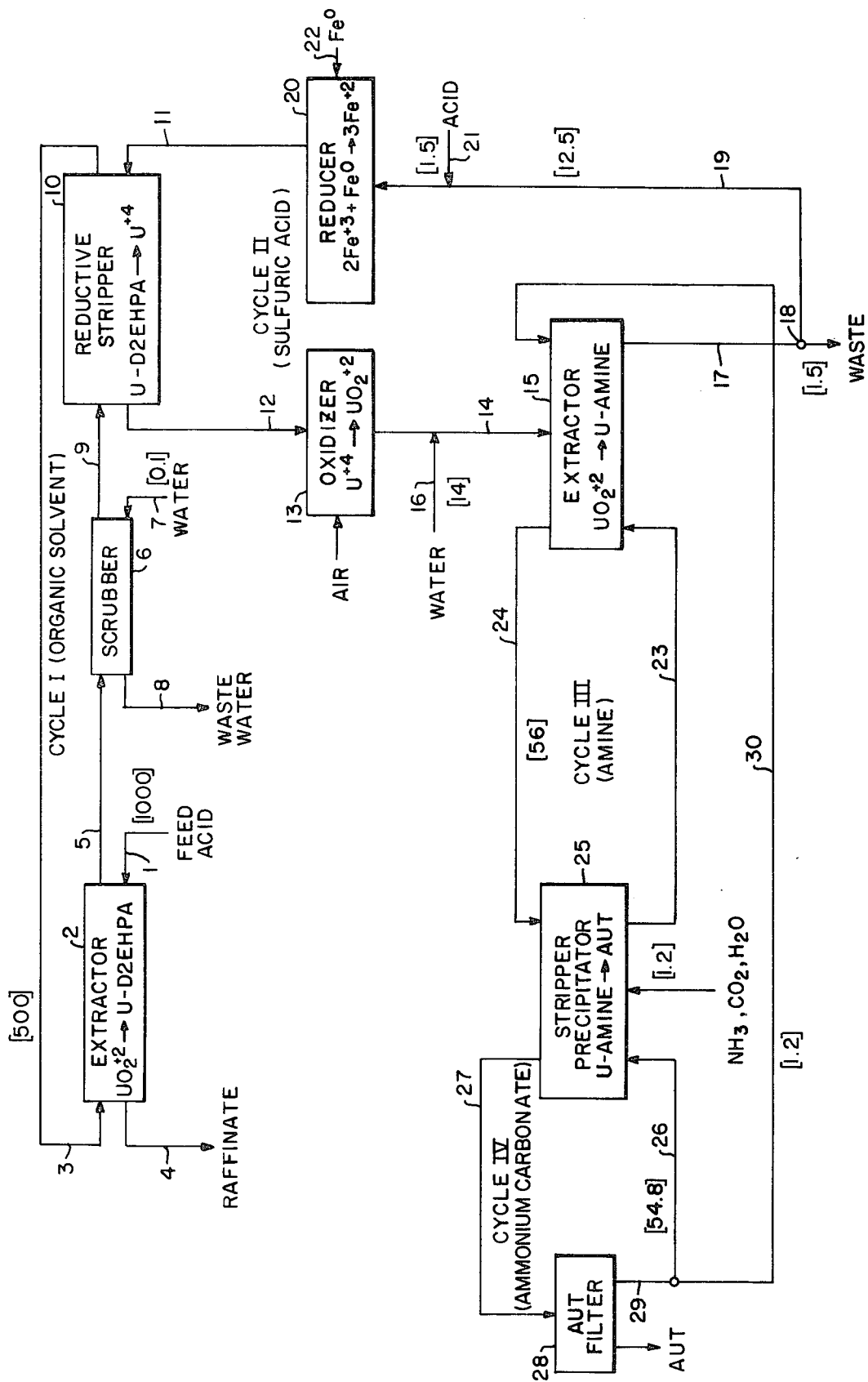

COUPLED CATIONIC AND ANIONIC METHOD OF SEPARATING URANIUM

CROSS REFERENCE TO RELATED APPLICATIONS

This application is related to application Ser. No. 390,997 filed Aug. 23, 1973 by P. S. Sundar titled "Sulfide Precipitation Method of Separating Uranium From Group II and Group III Metal Ions."

This application is also related to application Ser. No. 411,886 filed Nov. 1, 1973 by L. Elikan, W. L. Lyon and P. S. Sundar titled "Uranium Complex Recycling Method of Purifying Uranium Liquors."

BACKGROUND OF THE INVENTION

Fertilizer is made from a phosphoric acid liquor which incidentally contains significant amounts of uranium, typically about 0.2 g/l. In order not to waste the valuable uranium, processes have been developed by Oak Ridge National Laboratories to separate it from the acidic liquor which is contaminated with metal ions, principally iron in a typical amount of about 12 g/l or more.

The Oak Ridge "DAPEX" process is a cationic process divided into two extraction cycles. (See the article in I&EC Process Design and Development, Vol. II, page 122, January 1972 by F. J. Hurst, D. J. Crouse, and K. B. Brown titled "Recovery of Uranium from Wet-Process Phosphoric Acid." The same process is described in more detail by F. J. Hurst et al. in ORNL-TM-2522 Report titled "Solvent Extraction of Uranium From Wet-Process Phosphoric Acid," April 1969. Also see U.S. AEC Report, ORNL 2952, June 30, 1960 by F. J. Hurst and D. J. Crouse, titled "Recovery of Uranium from D2EHPA Extractant with $(NH_4)_2CO_3$.") In the first cycle the uranyl ion ($UO_2^{+2}$) and some ferric ion are extracted using di-2-ethylhexyl phosphoric acid (D2EHPA) in kerosene, the uranyl ion forming a complex with the D2EHPA. The solvent is then stripped with a portion of the acid leaving the extractor and containing ferrous ion to produce a concentrated acidic aqueous stream of ferrous and uranous (U+4) ions. The uranous ion is then oxidized with air to the uranyl ion.

In the second cycle of the DAPEX process the concentrated acidic, aqueous stream from the first cycle is again extracted with kerosene containing D2EHPA, then stripped with water containing 2 to 2.5 moles/l $(NH_4)_2CO_3$ which precipitates ammonium-uranyl-tricarbonate (AUT), $(NH_4)_4UO_2(CO_3)_3$, and some ferric hydrate. The AUT could then be recrystallized to purify it.

The DAPEX process typically recovered about 94% of the uranium in the feed and produced uranium containing 2 to 4% iron (based on the uranium) before recrystallizaton. Ceramic grade uranium, which is used as fuel in reactors, requires no more than 0.04% iron (based on the uranium). (All percentages herein are by weight unless otherwise indicated.)

Oak Ridge National Laboratories has also developed an anionic exchange uranium extraction process called the "AMEX" process. (See the article by D. J. Crouse and K. B. Brown titled "Amine Extraction Processes for Uranium Recovery from Sulphate Liquors, Vol. I," U.S. Atomic Energy Commission, ORNL-1959, Sept. 30, 1955 and the article by D. J. Crouse et al. titled "Progress Report on Separation and Recovery of Uranium and Thorium from Sulfate Liquor by the AMEX Process," U.S. Atomic Energy Commission, ORNL-2173, Jan. 1, 1957). The AMEX process, because of the anionic exchange mechanism of the amines, is generally used to extract uranium from sulfuric acid leach liquors containing 1.0 to 2.0 g/l of uranium. The sulfuric acid liquor is contacted with an organic solvent containing long chain alkylamines. The uranium can be stripped from the organic solvent using ammonium carbonate. The AMEX process is reported to extract at least 95% of the uranium with about 2% contaminants, based on the uranium.

SUMMARY OF THE INVENTION

We have discovered a coupled cationic-anionic process for separating uranium. While generally cationic processes are not compatible with anionic processes, we have found that a coupled cationic-anionic process is not only feasible, but is also superior to either the DAPEX or AMEX process. In our process the uranium is extracted into an organic phase, stripped into an aqueous carbonate or sulfuric acid phase, extracted with an amine, then precipitated as a uranium complex such as ammonium-uranyl-tricarbonate (AUT) using ammonium carbonate. Our process will separate uranium from any ion which has an amine extraction coefficient less than or equal to the extraction coefficient obtainable with the reagent used in the first extraction cycle, including ions of aluminum, vanadium, molybdenum, and iron. Also, any ion which will not form a complex with the amine will be separated. Generally, monovalent and divalent ions such as sodium, potassium, calcium, and magnesium will not form complexes in any significant amount.

The iron contamination in the product of our process is typically less than 1000 ppm (based on the uranium), which is high-purity uranium. Ceramic (i.e., nuclear reactor) grade uranium is expected to be produced without difficulty as the process is further refined. The cost of obtaining ceramic grade uranium with our process is expected to be considerably less than the cost with the prior processes. More than 98% of the uranium in the feed is recovered.

DESCRIPTION OF THE INVENTION

The accompanying drawing is a diagram illustrating a certain process according to this invention. The process illustrated is the preferred process with the exception that Cycle II has been illustrated for a sulfuric acid liquor instead of a carbonate solution since the cycle is slightly more complicated when a sulfuric acid liquor is used. Typical flow rate ratios are given in the drawing in brackets and may be taken as gal/hr., gal/min., liters/min. etc. The process is preferably at ambient temperature as that is least expensive. The process is described for continuous operation, but it is understood that adjustments may be needed in flow rates, concentrations, etc. during start-up.

CYCLE I

Referring to the drawing, in Cycle I feed acid from line 1 enters extractor 2. This feed is typically an aqueous solution of phosphoric or sulfuric acid having a pH of about 1 to about 4; of the two, phosphoric acid is more common and the process of this invention is particularly applicable to phosphoric acid liquors. The liquor typically contains about 0.1 to about 0.5 g/l of uranium (as the uranyl ion, $UO_2^{+2}$) and about 7 to about 15 g/l of iron (as $Fe^{+++}$). The feed could also be a carbonate or other type of liquor which contains uranyl ions. The presence of chlorides, fluorides, or nitrates in the feed interferes with the extraction by the organic solvent but small concentrations will not render the process inoperable.

In the extractor the feed acid is mixed with a non-interfering, water-immiscible, organic solvent from line 3 containing a reagent which reacts with the uranyl ions in the liquid to form a complex soluble in the solvent. The ratio (by volume) of the aqueous liquor to the solvent is preferably about 0.1 to about 10 since at less than about 0.1 dispersions may form (although there are ways to handle that problem) and at more than about 10 the uranium is unnecessarily diluted. A ratio of about 1.0 seems to work best. The solvent is preferably an aliphatic compound as the uranium complexes are very soluble in them and they aid in the extraction process. Kerosene, a mixture of linear hydrocarbons having 10 to 14 carbon atoms, is the preferred solvent as it is inexpensive and commercially available. Other suitable solvents include n-heptane, n-octane, chloroform, etc.

The reagent in the solvent used to form the uranium complex is preferably a di-alkyl phosphoric acid having 4 to 10 carbon atoms in each chain when the liquor is a phosphoric acid liquor. The preferred di-alkyl phosphoric acid is di-2-ethyl-hexyl phosphoric acid (D2EHPA) because it is very effective in extracting uranium. The concentration of reagent is typically about 0.1 to about 1 mole/l depending on the reagent used. The D2EHPA exists as the dimer $H([CH_3(CH_2)_7]_2PO_4)_2$ and two dimers react with a uranyl ion to form the complex $UO_2H_2([CH_3(CH_2)_7]_2PO_4)_4$, denoted herein as U-D2EHPA. If the liquor is a sulfuric acid liquor or a sodium carbonate liquor strong base amines can be used as reagents.

The amount of uranium extracted can be increased and the phase separation between the aqueous liquor and the solvent can be improved if about 0.025 to about 0.25 mole/l of a synergistic agent is included in the solvent. Synergistic agents are selected to be compatible with the reagent used as is known to the art. For example, if D2EHPA or a similar compound is the reagent, a trialkylphosphate, trialkylphosphonate, trialkylphosphinate, or trialkylphosphine oxide can be used as a synergistic agent, where the alkyl chains are linear from $C_4$ to $C_{10}$. Tri-n-octyl phosphine oxide (TOPO) is preferred for use with D2EHPA as it is highly effective.

The raffinate in line 4 is used in making fertilizer or other products. The solvent, enriched with the complexed uranium but contaminated with ferric or other ions, passes through line 5 to scrubber 6. Water enters scrubber 6 from line 7 and waste water leaves by line 8, removing acid and ions which may interfere with amine extraction in Cycle III. The water scrub is necessary only if the feed liquor to cycle III is a sulfuric acid or sodium carbonate liquor. The scrubbed solvent passes through line 9 to reductive stripper 10, and then is recycled to extractor 2.

CYCLE II

In reductive stripper 10 the organic solvent is contacted with a stripping liquor which enters the reductive stripper from line 11. The ratio by volume of organic solvent to stripping liquor may be about 0.1 to about 100, but is preferably about 20 to about 35 since at a ratio of less than 20 the uranium is unnecessarily diluted and at a ratio of more than 35 some of the uranium may not be completely stripped.

The stripping liquor may be a carbonate liquor or a sulfuric acid liquor. A sulfuric acid liquor should have a pH of at least about 0.5 as a lower pH may decompose the organic solvent. Also, the pH should be less than about 5 as a higher pH may precipitate metallic hydroxides. A pH of about 0.5 to about 1.5 is preferred for optimum operating efficiency. The sulfuric acid liquor contains at least about 25 g/l of a reducing ion, preferably as ferrous ion because of its low cost, to reduce the uranium to the uranous ion which is insoluble in the organic solvent and enters the stripping liquor.

A sulfuric acid stripping liquor enters line 12 from reductive stripper 10 and passes to oxidizer 13 where the uranous ion is oxidized to the uranyl ion which is extractable in Cycle III. Air is preferred for the oxidation. From the oxidizer the liquor passes through line 14 to extractor 15. Water from line 16 is added as necessary to lower the uranium concentration below the saturation concentration of the amine complex to enable all of the uranium to be extracted in extractor 15. Since inefficiencies in the apparatus must be allowed for, the uranium concentration is preferably lowered to about 50 to about 70% of the saturation concentration of the amine complex. The water from line 16 is also used to raise the pH. Uranium does not extract well below a pH of about 0.9, but a pH greater than about 1.5 unnecessarily dilutes the sulfuric acid; however this is not as important a consideration as controlling the uranium concentration.

The sulfuric acid liquor leaves extractor 15 through line 17. At least about 17% by volume of the stream in line 17 is discarded or used for other purposes (e.g., rock digestor) in line 18 to control the sulfuric acid concentration and to prevent the build-up of iron and other contaminants. The remaining liquor passes through line 19 to reducer 20. Additional sulfuric acid is added through line 21 to bring the sulfuric acid concentration within previously-described limits. Iron particles are added through line 22 and are oxidized to the ferrous ion, reducing the ferric ion to ferrous ion. Sufficient particles should be added to raise the ferrous ion concentration to at least about 25 g/l to insure the reduction of all the uranium in reductive stripper 10. While the ferrous ion is preferred because of its low cost, other reducing ions could also be used. The sulfuric acid should be blanketed with carbon dioxide or another nonoxidizing gas at reducer 20 to prevent oxidization of the ferrous ion.

The above description of Cycle II applies if the stripping liquor is a sulfuric acid liquor. If a carbonate solution is used the uranium enters the carbonate solution as the uranyl tricarbonate ion, $UO_2(CO_3)_3^{-4}$, and reducer 20, oxidizer 13, and line 21 are eliminated, and line 18 is reduced to at least about 2% of line 17 but otherwise it is the same. If a carbonate liquor is used it should have a pH of about 8 to about 9 since at a pH of below about 8 it will not strip uranium well and above a pH of about 9 the amine extraction in Cycle III is less effective. The carbonate solution should be about 0.25 to about 0.75 M since at less than about 0.25 M the amine extraction in Cycle III is less effective and at more than about 0.75 M a uranium complex may precipitate. The carbonate may be ammonium carbonate, alkali metal carbonate, or mixtures thereof, but sodium carbonate is preferred as it is less expensive. A carbonate solution is preferred to a sulfuric acid liquor as a stripping liquor because no iron is introduced in a carbonate solution and a high iron concentration suppresses the extraction of uranium in Cycle III.

CYCLE III

In extractor 15 hexavalent uranium in the stripping liquor is contacted with an amine liquor from line 23. The ratio (by volume) of stripping liquor to amine liquor is preferably about 0.1 to about 1 since at less than about 0.1 the stripping liquor may become entrained in the amine liquor and at more than about 1 the loss of the costly amines due to entrainment is high. The amine liquor comprises a water-immsicible, non-interfering, organic solvent in which the amine complex is soluble, about 0.1 to about 0.5 M of an amine, and about 1 to about 10% (by volume) of a solubilizer. If the stripping liquor is a sulfuric acid liquor the complex $(R_3NH)_2.UO_2(SO_4)_2$ is formed if a tertiary amine is used and $(R_4N)_2.UO_2(SO_4)_2$ is formed if a quaternary amine is used. If the stripping liquor is a carbonate solution the complex $(R_3NH)_4.UO_2(CO_3)_3$ is formed if a tertiary amine is used and $(R_4N)_4.UO_2(CO_3)_3$ is formed if a quaternary amine is used.

The organic solvent was previously described in the description of Cycle I.

The amine has the general formula $N(R)_n$ where $n$ is 3 to 4 (i.e., a tertiary or quaternary amine) and R is alkyl from about $C_7$ to about $C_{12}$. If a sulfuric acid liquor is used in Cycle II tertiary amines are preferred to quaternary amines. If a carbonate liquor is used in Cycle II either tertiary or quaternary amines may be used effectively. Each R group may be independently selected, but identical R groups give better extraction. For the same reason linear R groups are preferred to branched groups. The optimum selective extraction is obtained when R is $C_8$ and $n$ is 3, that is, triiso-octylamine or tri-n-octylamine. Examples of other suitable amines include trioctadecylamine, tri(2-ethylhexyl) amine, tert-n-octylamine, tert-iso-octylamine, tri-heptylamine, diheptyl-octylamine, di-(2-ethylhexyl)-di-octylamine, etc. The preferred amine concentration is about 0.1 to about 0.2 M. A more complete description of amine extraction of uranium may be found in an article by C. F. Coleman et al. titled "Solvent Extraction with Alkyl Amine," published in Industrial and Engineering Chemistry, Vol. 50, No. 12, December 1958.

The purpose of the solubilizer in the amine liquor is to increase the solubility of the amine complex in the amine liquor. Suitable solubilizers include the monohydric alcohols from $C_6$ to $C_{12}$, for example, hexanol, heptanol, n-octanol, iso-octanol, 2-ethyl-hexanol, nonanol, decanol, undecanol, dodecanol, etc. The preferred solubilizers are n-octanol, n-decanol, or mixtures thereof as they are most effective. Preferably, the amount of solubilizer is about 2 to about 5% since at less than about 2% three phases may form and more than about 5% dilutes the amine phase unnecessarily. The best procedure is to run a preliminary test to determine the amount of solubilizer needed and to use only the minimum required.

The amine liquor passes from extractor 15 through line 24 to stripper-precipitator 25.

CYCLE IV

In stripper-precipitator 25 the amine liquor is mixed with sufficient ammonium carbonate solution to precipitate a uranium complex, preferably ammonium-uranyl-tricarbonate (AUT). (Although ammonium diurante (ADU), a complex of hydrated uranyl hydroxide and a salt can also be precipitated, the precipitation of AUT is preferred as it is easier to filter.) The volume ratio of amine liquor to ammonium carbonate solution is preferably about 0.3 to about 1 since at more than about 1.0 emulsions may begin to form, and at less than about 0.3 the uranium is unnecessarily diluted. Generally, about 0.75 to about 3 M ammonium carbonate is a suitable concentration, but about 2 to about 3 M is preferred. While ammonium bicarbonate can be used, more is required and therefore ammonium carbonate is preferred. Since, whenever ammonium carbonate is present, the bicarbonate is also present, it is understood the term "ammonium carbonate" is intended hereinafter to include the bicarbonate. If a quaternary amine was used in Cycle III it is preferred to strip with an ammonium carbonate solution containing about 1 to about 5% ammonium chloride to improve the stripping of the uranium. See the article by F. J. Hurst et al titled "Recovery of Uranium from Amine Extractants with Ammonium Carbonate," ORNL 3064, issued Feb. 15, 1961 by Oak Ridge National Laboratories.

The ammonium carbonate solution passes through line 27 to AUT filter 28 where the AUT is filtered off. Most of the filtrate in line 29 is recycled through line 26 to stripper-precipitator 25. However, up to about 5% by volume of the stream in line 29 may be bled through line 30 to extractor 15 to prevent the build-up of certain contaminates such as vanadium, molybdenum, and thorium.

The precipitated AUT can be calcined in an oven at about 350° to about 900°C which drives off carbon dioxide and ammonia. If the calcining is done in a reducing atmosphere, such as hydrogen-nitrogen mixture, $UO_2$ is obtained. If the calcining is done in an oxidizing atmosphere, such as air, the mixed oxide $U_3O_8$ is obtained.

The following example further illustrates this invention.

EXAMPLE

This example is a preliminary study to evaluate a particular reagent and diluent used in the Cycle III of the process. The example is not intended to simulate the process and greatly improved results are expected in a refined process.

Since the available data in the literature for tri-iso-octyl amine solvents were for uranium extractions of low uranium (1–1.5 g/l) and low iron (4–6 g/l) in the acid phase, preliminary shakeout tests were made to obtain equilibrium and solvent capacity data for three solvent reagent concentrations for the anticipated feed acid containing approximately 12 g/l of uranium and 25 g/l of iron. The acid concentration was assumed to be 0.5 $\underline{M}$ $H_2SO_4$ (ph 1.0). All shakeout tests were performed at an aqueous to organic phase ratio of 1.0, over a period of 5 minutes at 100 shakes/minute in a wrist action shaker.

Three different reagent concentrations (0.1, 0.2 and 0.4M) of tri-iso-octyl amine (sold by Ashland Chemical Co. under the trademark "ADOGEN-381") were studied. The solvent was contacted with 0.5 $\underline{M}$ $H_2SO_4$ containing ~50 g/l of uranium only. The density of the solvent was determined before and after the shakeout. Uranium extracted, assuming [UO₂.SO₄.H₂SO₄] as extracted species, was calculated from the density differences. The results obtained are given in Table 1.

TABLE 1

Saturation Shakeout Results
Aqueous Phase  0.5 M H₂SO₄; 50 g/l U
Phase ratio  1:1

| No. | Solvent Concentration | Theoretical Max. U g/l | Actual U g/l | Percent Theoretical |
|---|---|---|---|---|
| 1 | 0.1 M | 11.9 | 6.76 | 56.75 |
| 2 | 0.2 M | 23.8 | 13.00 | 54.50 |
| 3 | 0.4 M | 47.6 | 24.05 | 50.60 |

It is assumed that the stoichiometry follows the equations:

a. $2R_3N_{org} + H_2SO_{4\,aq} \rightleftharpoons (R_3NH)_2\,SO_4\,org$
b. $(R_3NH)_2SO_{4\,org} + UO_2(SO_4)^{=}_{2\,aq} \rightleftharpoons (R_3NH)_2\,UO_2 + (SO_4)_{2\,org} + (SO_4)^{-2}_{aq}$ From stoichiometry, therefore, each mole of amine would extract 0.5 moles of uranium, assuming 100% purity of amines.

The phase separation (primary) was achieved in all cases in less than 1.0 minute. With 3 percent octanol as a diluent, there was no apparent tendency for third phase formation.

The equilibrium shakeout tests were carried out for 0.1 and 0.2 M "ADOGEN-381" solvents only. Synthetic acid feed consisting of 0.5 M sulfuric acid, 25 g/l of iron as ferric sulfate and varying amounts of uranium as uranyl sulfate was used. The results are tabulated in Table 2.

Material balance calculation to verify the analytical showed a large discrepancy between the analytical and estimated values for uranium in the aqueous phase in the case of 0.1 M "ADOGEN" solvent extraction. Duplicate shakeouts conducted showed similar results. The estimated values and the corresponding estimated extraction coefficient values, based on the assumption that the solvent analysis was correct, are given in Table 2. Small droplets of a different phase were observed to separate from the organic extract samples on long standing. X-ray scan on these show, approximately 10 percent by weight of uranium. Sufficient sample was not available for total identification of this phase. It is, however, believed that this is some form of secondary dispersion.

0.2 M "ADOGEN-381" solvent was selected to study the precipitation characteristics with 2.0 M ammonium carbonate solution. Approximately 500 ml. of 0.2 M solvent extract was contacted with 1.0 liter of 2 M ammonium carbonate solution in raked bottom container and mixed using an impeller. The precipitation was quick and fine, crystalline precipitate, easily filterable over medium filter paper, was obtained. The product was dried at 40°C until no weight loss was observed. Analysis of the precipitate indicated 66.0 percent by weight of uranium and is believed to be ADU corresponding to the formula [UO₂(OH)₂; 0.5 (NH₄)₂CO₃; 0.5 H₂O]. The analysis for iron indicated 1000 ppm of iron by weight based on the uranium in the ADU.

REDUCTIVE STRIPPING WITH SULFURIC ACID 0.3 M D2EHPA — 0.075 M TOPO — AMSCO 450 solvent extract containing 12 g/l uranium was contacted with sulfuric acid of varying concentrations and containing approximately 18 to 20 g/l of $Fe^{+2}$. The sulfuric acid used in the reductive strip forms the feed to the second cycle extractor. It is therefore important that the acid concentration used for reductive strip be compatible to the extraction operation.

To obtain 18 to 20 g/l of $Fe^{+2}$ in solution, 11 g/l of $Fe^{+3}$ was added first as sulfate to the acid which was then reduced with 7 to 9 g/l of $Fe^0$ or iron powder under a nitrogen blanket. The separatory funnels were purged with nitrogen before the shakeout to prevent reoxidation of $Fe^{+2}$ to $Fe^{+3}$. The results are given in Table 3. Though the phase separation was satisfactory, the stripping of the D2EHPA-TOPO was not satisfactory due to insufficient iron. Further studies of stripping coefficient dependence on the Fe(+2) ion concentration and pH are required before any categorical conclusions could be made.

TABLE 2

Equilibrium Shakeout Results
Aqueous phase  0.5 M H₂SO₄, 25 g/l iron
Organic Phase  "ADOGEN-381", 3% n-octanol, "AMSOC-450"[1]
Phase ratio  1:1

| | | 0.1 M "ADOGEN" RESULTS | | | | 0.2 M "ADOGEN" RESULTS | | |
| No. | $[U]_{org}$ g/l | $[u]_{aq}$ g/l | $[U]_{aq}*$ g/l | $E_u^0$ | $E_u^{0*}$ | $[U]_{org}$ | $[U]_{aq}$ | $E_u^0$ |
|---|---|---|---|---|---|---|---|---|
| 1 | 1.40 | 11.6 | 13.6 | 0.121 | 0.103 | 3.2 | 11.20 | 0.286 |
| 2 | 1.50 | 7.1 | 8.5 | 0.211 | 0.177 | 3.1 | 6.90 | 0.450 |
| 3 | 1.30 | 2.3 | 3.7 | 0.565 | 0.351 | 2.9 | 1.90 | 1.525 |
| 4 | 0.98 | 0.52 | 1.52 | 1.88 | 0.645 | 2.1 | 0.29 | 7.25 |
| 5 | 0.57 | 0.14 | 0.68 | 4.08 | 0.838 | 1.2 | 0.072 | 16.20 |
| 6 | 0.24 | 0.038 | 0.26 | 6.32 | 0.925 | 0.5 | 0.023 | 21.75 |

$[U]_{aq}*$ = concentration of aqueous phase from material balance
$E_u^{0*} = [U]_{org}/[U]_{aq}*$
[1] Odorless kerosene sold by American Oil Co.

TABLE 3

Reductive Strip Shakeout Results
Aqueous phase  Sulfuric acid
Organic phase  0.3 M D2EHPA-0.075 M TOPO-AMSCO 450
Phase ratio  1:1
Contact time  10 min.
Stripping Coefft $\Delta$  $\dfrac{\text{Eqbm. Uranium in Acid}}{\text{Eqbm. Uranium in Organic}}$

| No. | H₂SO₄ Conc. M | $Fe^{+2}$ in Acid g/l | Eqbm. U in Acid g/l | Eqbm. U in Stripping Organic g/l | Coefft. |
|---|---|---|---|---|---|
| 1 | 0.5 | 18.0 | 0.05 | 12.0±0.2 | 0.0042 |

TABLE 3-continued

| | | Reductive Strip Shakeout Results | | | |
|---|---|---|---|---|---|
| Aqueous phase | | Sulfuric acid | | | |
| Organic phase | | 0.3 M D2EHPA-0.075 M TOPO-AMSCO 450 | | | |
| Phase ratio | | 1:1 | | | |
| Contact time | | 10 min. | | | |
| Stripping Coefft $\Delta$ | | $\dfrac{\text{Eqbm. Uranium in Acid}}{\text{Eqbm. Uranium in Organic}}$ | | | |
| No. | $H_2SO_4$ Conc. M | $Fe^{+2}$ in Acid g/l | Eqbm. U in Acid g/l | Eqbm. U in Organic g/l | Stripping Coefft. |
| 2 | 2.0 | 18.0 | 0.068 | 12.0±0.2 | 0.0060 |
| 3 | 4.0 | 20.0 | 0.300 | 12.0±0.2 | 0.565 |

We claim:
1. A method of separating uranium from contaminating ions in an aqueous feed liquor containing uranyl ion comprising:
   1. extracting said feed liquor with a first, non-interfering, water-immiscible, organic solvent containing a reagent which reacts with said uranyl ion to form a complex soluble in said solvent; 2. either
      A. stripping said organic solvent with a stripping liquor of an aqueous carbonate solution having a pH of about 8 to about 9 and a molarity of about 0.25 to about 0.75 or
      B. (1) stripping said organic solvent with a stripping liquor of an aqueous sulfuric acid liquor having a pH of about 0.5 to about 5 containing a reducing ion, 2. oxidizing uranous ion in said sulfuric acid liquor to uranyl ion, and 3. adjusting the pH of said sulfuric acid liquor to about 0.9 to about 1.5;
   3. extracting said stripping liquor with an amine liquor comprising a second, non-interfering, water-immiscible, organic solvent, about 0.1 to about 0.5 M of an amine having the formula

$$N{+}R_n$$

where $n$ is 3 to 4 and each R is independently selected from alkyl from $C_7$ to $C_{12}$, and about 1 to about 10% by volume of a solubilizer;
   4. stripping said amine with an ammonium carbonate solution containing sufficient ammonium and carbonate ions to precipitate a uranium complex; and
   5. collecting said precipitated uranium complex.
2. A method according to claim 1 wherein said organic solvent is recycled to form a closed loop, said stripping liquor is recycled to form a closed loop, said amine liquor is recycled to form a closed loop, and said ammonium carbonate solution is recycled to form a closed loop.
3. A method according to claim 2 wherein when said stripping liquor is a sulfuric acid liquor at least about 17% by volume of said sulfuric acid liquor is not recycled after stripping and when said stripping liquor is a carbonate solution at least about 2% by volume is not recycled after stripping.
4. A method according to claim 1 wherein up to about 5% by volume of said ammonium carbonate solution is bled to said stripping liquor.
5. A method according to claim 1 wherein said aqueous feed liquor is a sulfuric acid, phosphoric acid, or sodium carbonate liquor and between steps (1) and (2) said organic solvent is scrubbed with water.
6. A method according to claim 1 wherein $n$ is 3.
7. A method according to claim 1 wherein each R group is identical.
8. A method according to claim 7 wherein said amine is selected from the group consisting of tri-iso-octylamine, tri-n-octylamine, and mixtures thereof.
9. A method according to claim 1 wherein the concentration of said solubilizer is about 2 to about 5%.
10. A method according to claim 1 wherein said solubilizer is a monohydric alcohol from $C_6$ to $C_{12}$.
11. A method according to claim 1 wherein the concentration of said ammonium and said carbonate ions is about 0.75 to about 3 M.
12. A method according to claim 11 wherein the concentration of said ammonium and said carbonate ions is about 2 to about 3 M.
13. A method according to claim 1 wherein said reagent has the general formula

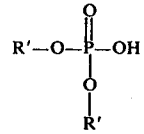

where each R' is independently selected from alkyl from $C_4$ to $C_{10}$.
14. A method according to claim 13 wherein said reagent is di-2-ethyl-hexyl phosphoric acid.
15. A method according to claim 14 wherein said solvent includes about 0.025 to about 0.25 moles per liter of a synergistic agent.
16. A method according to claim 15 wherein said synergistic agent is tri-octyl phosphine oxide.
17. A method according to claim 1 wherein said first and second solvents are linear hyrocarbons having 10 to 14 carbon atoms.
18. A method according to claim 1 wherein the concentration of said reagent is about 0.1 to about 1 mole per liter of said first solvent.
19. A method according to claim 1 wherein said collected uranium complex is calcined at about 350° to about 900°C.
20. A method according to claim 19 wherein said calcining is done in an oxidizing atmosphere to produce the mixed oxide $U_3O_8$.
21. A method according to claim 19 wherein said calcining is done in a reducing atmosphere to produce $UO_2$.
22. A method according to claim 1 wherein the volume ratio of said feed liquor to said first organic solvent is about 0.1 to about 10, the volume ratio of said first organic solvent to said stripping liquor is about 0.1 to about 100, the volume ratio of said stripping liquor to said amine liquor is about 0.1 to about 1, and the volume ratio of said amine liquor to said ammonium carbonate solution is about 0.3 to about 1.

23. A method according to claim 1 wherein said stripping liquor is an aqueous carbonate solution, selected from the group consisting of solutions of ammonium carbonate, alkali metal carbonate, and mixtures thereof.

24. A method according to claim 23 wherein said aqueous carbonate solution is a sodium carbonate solution.

25. A method according to claim 1 wherein said uranium complex is ammonium-uranyl-tricarbonate.

26. A method according to claim 1 wherein said feed liquor is phosphoric acid containing about 0.1 to about 0.5 g/l of uranium and about 7 to about 15 g/l of iron.

27. A method according to claim 1 wherein the ratio by volume of said organic solvent to said stripping liquor is about 20 to about 35.

28. A method according to claim 1 wherein said aqueous sulfuric acid liquor has a pH of about 0.5 to about 1.5.

29. A method according to claim 1 wherein said reducing ion is ferrous ion in an amount of at least about 25 g/l.

30. A method according to claim 29 wherein said ferrous ion is obtained by the addition of elemental iron which is oxidized to the ferrous ion by reducing ferric ion to ferrous ion.

31. A method according to claim 30 wherein said sulfuric acid liquor is blanketed with a non-oxidizing gas to prevent the oxidation of said ferrous ion.

32. A method according to claim 1 wherein said uranous ion is oxidized with air.

33. A method according to claim 3 wherein additional sulfuric acid liquor is added to replace said sulfuric acid liquor which is not recycled.

34. A method according to claim 1 wherein the uranium concentration is lowered with water just prior to step (3) to about 50 to about 70% of the saturation concentration of the complex said uranium forms with said amine.

35. A method according to claim 1 wherein said amine concentration is about 0.1 to about 0.2M.

36. A method according to claim 10 wherein said solubilizer is n-octanol, n-decanol, or a mixture thereof.

37. A method according to claim 1 wherein the amount of said solubilizer is about 2 to about 5%.

38. A method according to claim 1 wherein said ammoniun carbonate solution contains about 1 to about 5% ammonium chloride.

* * * * *